UNITED STATES PATENT OFFICE.

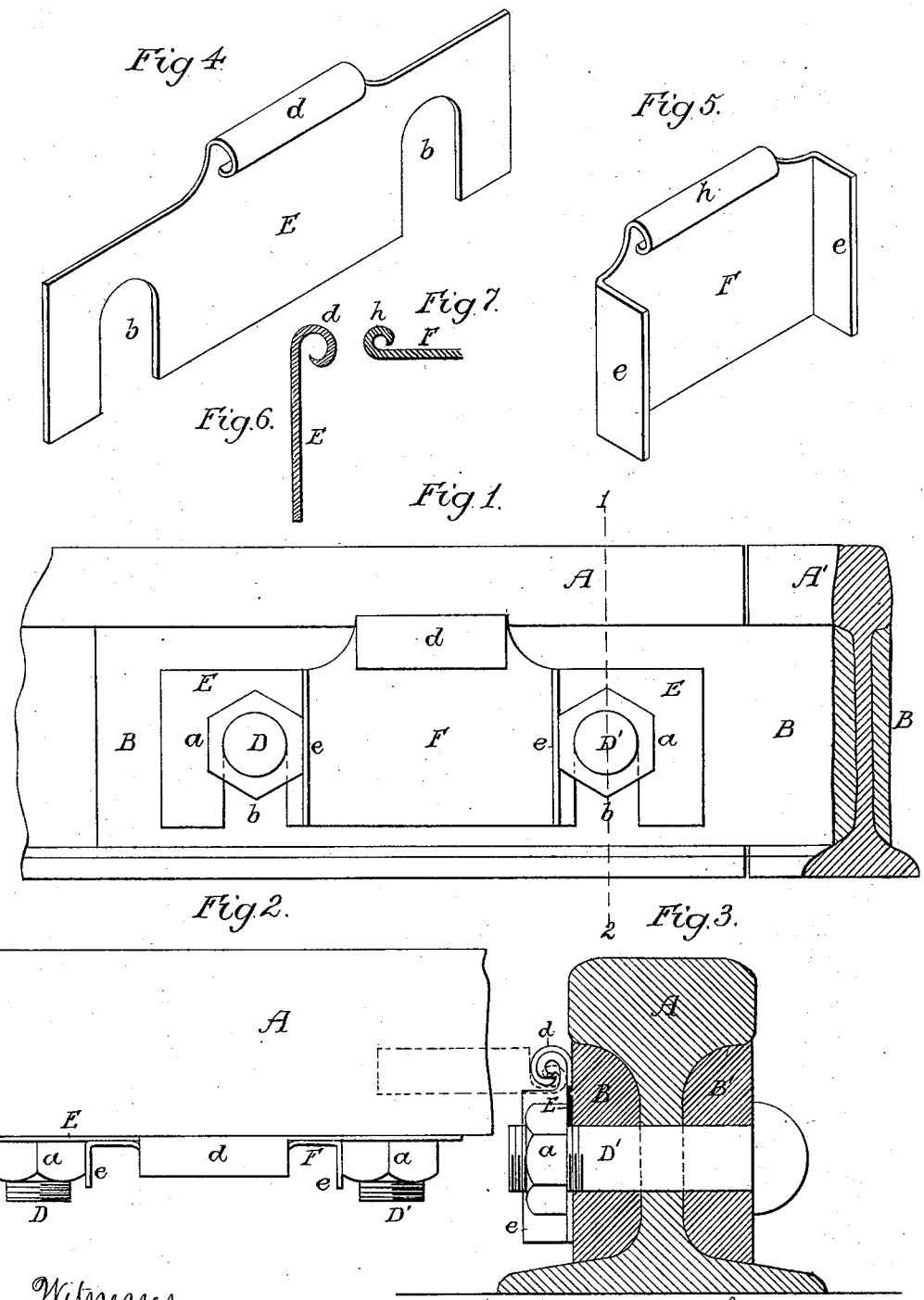

THOMAS CURRY, OF PHILADELPHIA, PENNSYLVANIA.

NUT-LOCK.

SPECIFICATION forming part of Letters Patent No. 260,949, dated July 11, 1882.

Application filed May 22, 1882. (No model.)

*To all whom it may concern:*

Be it known that I, THOMAS CURRY, a citizen of the United States, and a resident of Philadelphia, Pennsylvania, have invented certain Improvements in Nut-Locks, of which the following is a specification.

My invention consists mainly of two plates hinged together and adapted to two bolts and to any objects confined thereby, one plate serving as a washer for the nuts of the bolts, and the other plate serving as a nut-retainer, all substantially as described hereinafter.

In the accompanying drawings, Figure 1 is a side view of portions of two rails and rail-splices with my improved nut-locking device; Fig. 2, a plan view of Fig. 1; Fig. 3, a transverse section on the line 1 2, Fig. 1; Figs. 4 and 5, perspective views of plates appertaining to the device, and Figs. 6 and 7 sectional views of the bent portions of the plates.

A A' are parts of adjoining rails, B B' the usual splicing-bars, and D D' bolts passing through the said bars and through one of the rails, and furnished with nuts $a$, preferably six-sided. Between the nuts and the splicing-bar B intervenes a plate, E, the openings $b\ b$ in which for the admission of the bolts by preference extend through the lower edge of the plate, which can thus be adjusted to its place without entirely removing the nuts from the bolt. At the upper edge of the plate E, and forming part of the same, is a projection, $d$, bent to a tubular form, a space, $f$, however, intervening between the extreme edge of the bent projection and the body of the plate, as shown in Fig. 6. A plate, F, is bent at its opposite ends so as to form wings $e\ e$, the upper edge, $h$, of this plate being also bent to a tubular form, and being of such dimensions that when held in the position shown in Fig. 7 it can be introduced endwise into the tubular projection $d$ of the plate E, to which the plate F is thus hinged, and can be adjusted to bear against the said plate E between the nuts $a\ a$, which are thus prevented from turning by the wings $e\ e$ of the said plate F, and this plate can be turned upward on its hinge, as shown by dotted lines in Fig. 3, whenever it becomes necessary to tighten the nuts, the plate being permitted to fall so as to retain the said nuts after they have been tightened.

Although I have described and illustrated my invention as applied to a rail-splice, it may be adopted in other connections where two bolts are used and where washers are desirable, for it will be seen that the plate E serves the twofold purpose of a washer and of a medium through which the hinged plate F is held in position.

I claim as my invention—

1. The combination of the plate E and its openings $b$ with the plate F, hinged to the said plate E and having wings $e\ e$, the two plates being adapted to two bolts and to the nuts of the same, substantially as set forth.

2. The combination of the plate E, having the bent projection $d$, with the plate F, having a projection, $h$, adapted for introduction endwise into the bent projection $d$ of the said plate E, substantially as specified.

In testimony whereof I have signed my name to this specification in the presence of two subscribing witnesses.

THOMAS CURRY.

Witnesses:
HARRY DRURY,
HARRY SMITH.